United States Patent
Hardy et al.

(10) Patent No.: US 9,677,735 B2
(45) Date of Patent: Jun. 13, 2017

(54) LAMP FOR VEHICLE

(71) Applicant: SL Corporation, Daegu (KR)

(72) Inventors: Aaron Hardy, Auburn Hills, MI (US); Elke Dieter, Auburn Hills, MI (US); Ju Yong Hwang, Auburn Hills, MI (US)

(73) Assignee: SL Corporation, Daegu (KR)

( * ) Notice: Subject to any disclaimer, the term of this patent is extended or adjusted under 35 U.S.C. 154(b) by 61 days.

(21) Appl. No.: 14/837,780

(22) Filed: Aug. 27, 2015

(65) Prior Publication Data

US 2017/0059108 A1   Mar. 2, 2017

(51) Int. Cl.
*F21V 9/00* (2015.01)
*F21S 8/10* (2006.01)
*B60Q 1/00* (2006.01)

(52) U.S. Cl.
CPC ......... *F21S 48/1317* (2013.01); *F21S 48/115* (2013.01); *F21S 48/1241* (2013.01); *B60Q 1/0041* (2013.01); *F21S 48/215* (2013.01); *F21S 48/225* (2013.01); *F21S 48/2225* (2013.01); *F21S 48/2237* (2013.01); *F21S 48/2243* (2013.01)

(58) Field of Classification Search
CPC .. F21S 48/1317; F21S 48/115; F21S 48/1241; F21S 48/1394; F21S 48/215; F21S 48/2225; F21S 48/2231; F21S 48/2237; F21S 48/2243; F21S 48/225; F21S 48/1154; F21S 48/12; F21S 48/1225; F21S 48/1233; F21S 48/1266; F21S 48/2268; F21S 48/25; B60Q 1/0011; B60Q 1/0041
See application file for complete search history.

(56) References Cited

U.S. PATENT DOCUMENTS

| | | | | |
|---|---|---|---|---|
| 4,949,226 A | * | 8/1990 | Makita | B60Q 1/0041 362/247 |
| 6,511,192 B1 | * | 1/2003 | Henion | B60Q 1/2665 248/476 |
| 2013/0272009 A1 | * | 10/2013 | Fujiu | B60Q 1/0058 362/517 |
| 2015/0277027 A1 | * | 10/2015 | Koizumi | G02B 6/0076 362/511 |

FOREIGN PATENT DOCUMENTS

| | | |
|---|---|---|
| JP | 2010-073426 A | 4/2010 |
| KR | 10-1453936 B1 | 10/2014 |

* cited by examiner

*Primary Examiner* — Y M. Lee
(74) *Attorney, Agent, or Firm* — Mintz Levin Cohn Ferris Glovsky and Popeo, P.C.; Kongsik Kim; Colleen H. Witherell (57) ABSTRACT

A lamp for a vehicle is provided and includes a first lamp module having an interior lens and at least one first light source. The first light source is configured to emit light toward the interior lens. Additionally, a second lamp module is disposed on a first side of the first lamp module and emits light and a third lamp module is disposed on a second side of the first lamp module and emits light and has an emission area that is different from the second lamp module.

16 Claims, 8 Drawing Sheets

LAMP FOR VEHICLE

BACKGROUND

1. Field of the Invention

An exemplary embodiment of the present invention relates to a lamp for a vehicle and more particularly, to improving the aesthetic aspects of the vehicle by displaying a predetermined repetition image.

2. Description of the Related Art

Generally, vehicles are equipped with lamps for illuminating nearby objects during low light conditions or for signaling nearby vehicles or pedestrians regarding the vehicle driving state. For example, headlights and fog lights are typically used to provide a lighting function, and turn signal lights, taillights, brake lights, and side marker lights are typically used for signaling functions. There are rules and regulations in place that state specification and installation criteria that automotive lamps are required to comply with to properly perform their functions.

Typically, vehicle lamps have been used for lighting functions or signaling functions however, the importance of the design of the lamps has steadily increased. For example, not only the functional aspects (e.g., securing a clear view for safety driving) but also the aesthetic aspects of lamps contributes to a buyer's vehicle purchasing decision. Therefore, a method is needed to provide a vehicle lamp, capable of producing static images by being turned on or off, but also displaying various images with an improved design, and thereby enhancing the aesthetic effect of the lamp on the entire vehicle.

SUMMARY

The present invention provides a lamp for a vehicle, to improve the aesthetic aspects of the vehicle by displaying a predetermined repetition image. According to an exemplary embodiment of the invention, a lamp for a vehicle, may include a first lamp module with an interior lens and at least one first light source, that may emit light directed toward the interior lens, a second lamp module disposed on a first side of the first lamp module and configured to emit light and a third lamp module disposed on a second side of the first lamp module, configured to emit light, and may have a different emission area from the second lamp module.

The second lamp module may include at least one second light source, that may be configured to emit light, a first half mirror, that may be configured to transmit a portion of the light emitted from the second light source therethrough and may be further configured to reflect the remaining portion of the emitted light. A first reflector may be positioned adjacent to (e.g., disposed facing) the first half mirror and may be configured to reflect the light reflected from the first half mirror back to the first half mirror. Further the third lamp module may include at least one third light source, which may be configured to emit light, a second half mirror, which may be configured to transmit a portion of the light emitted from the third light source therethrough and may further be configured to reflect the remaining portion of the emitted light. A second reflector may be positioned adjacent to the second half mirror and may be configured to reflect the light reflected from the second half mirror back to the second half mirror.

In some embodiments, the first half mirror may include a first extension portion, which may extend farther than the first reflector toward (e.g., in the direction of) the interior lens, and the second half mirror may include a second extension portion, which may extend farther than the second reflector toward the interior lens. The light emitted from the second light source may be incident upon the first extension portion, and the light emitted from the third light source may be incident upon the second extension portion. The third light source may be positioned ahead (e.g. in front of or proximate to) of the second light source.

In other embodiments, the first reflector may be positioned parallel to the first half mirror, and the second reflector may be positioned parallel to the second half mirror. In some embodiments, the second light source may be disposed at the rear portion of the interior lens and may thereby cause the light emitted therefrom to be incident upon the first half mirror through the interior lens. Additionally, the third light source may be disposed at the rear portion of the interior lens and may thereby cause the light emitted therefrom to be incident upon the second half mirror through the interior lens.

In another aspect, the lamp may include a first light guide that may be configured to emit the light emitted from the second light source toward (e.g., in the direction of) the first half mirror and a second light guide that may be configured to emit the light emitted from the third light source toward the second half mirror. The second light guide may be positioned ahead of (e.g. in front of or proximate to) the first light guide.

In some embodiments, the first half mirror and the first reflector may form a first original image and one or more first repetition images may be reflections of the first original image that may be configured to have the light emitted from the second light source. The second half mirror and the second reflector may form a second original image and one or more second repetition images, which may be reflections of the second original image, that may have the light configured to be emitted from the third light source. The first half mirror and the first reflector may form the first repetition images along a first direction and the second half mirror and the second reflector may form the second repetition images along a second direction. According to the exemplary embodiments, the aesthetic aspects of a vehicle may be improved by displaying a predetermined repetition image.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE EMBODIMENTS

Advantages and features of the invention and methods of accomplishing the same may be understood more readily by reference to the following detailed description of exemplary embodiments and the accompanying drawings. The invention may, however, be embodied in many different provides and should not be construed as being limited to the exemplary embodiments set forth herein. Rather, these exemplary embodiments are provided so that this disclosure will be thorough and complete and will fully convey the concept of the invention to those skilled in the art, and the invention will only be defined by the appended claims. Like reference numerals refer to like elements throughout the specification.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 1:
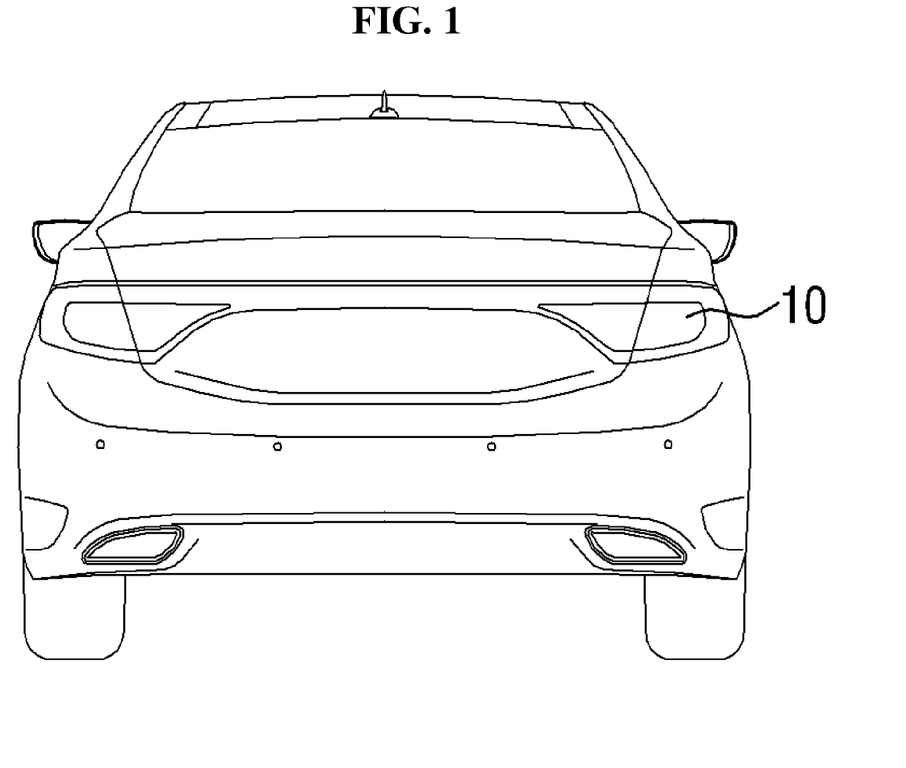
FIG. 1 is an exemplary view illustrating a lamp for a vehicle is installed at the rear portion of a vehicle according to an exemplary embodiment of the invention.

FIG. 1 is an exemplary view illustrating a lamp for a vehicle according to an exemplary embodiment of the invention, which may be installed at the rear portion of a vehicle. Referring to FIG. 1, a lamp 10 for a vehicle may include, a tail lamp that may be disposed at either side of the rear portion of a vehicle to alert the drivers of rearward vehicles or pedestrians, but the invention is not limited thereto. For example, the lamp 10 may include various other lamps installed in a vehicle, such as a headlamp that may be disposed at either side of the front of a vehicle, a turn signal lamp, or a position lamp.

Figure 2:
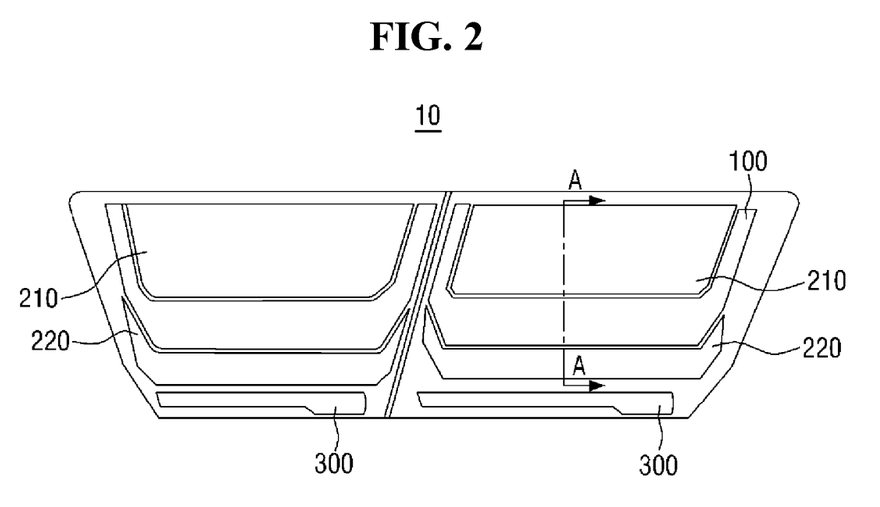
FIG. 2 is an exemplary front view illustrating the lamp for a vehicle according to an exemplary embodiment of the invention.
Figure 3:
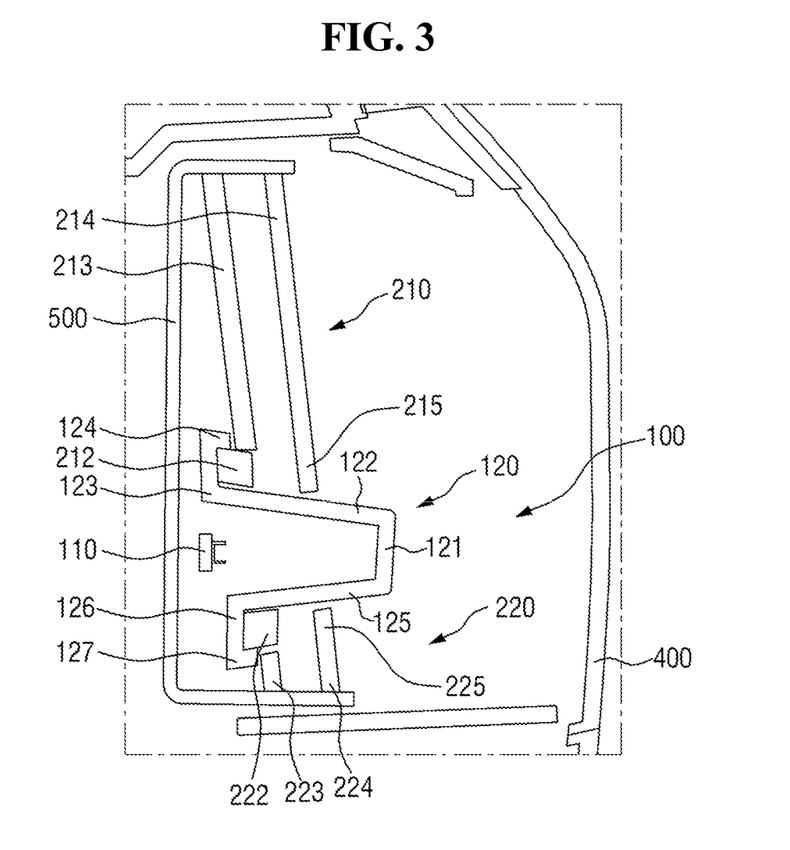
FIG. 3 is an exemplary cross-sectional view taken along line A-A of FIG. 2 according to an exemplary embodiment of the present invention.

FIG. 2 is an exemplary front view illustrating the lamp for a vehicle according to an exemplary embodiment of the invention. FIG. 3 is an exemplary cross-sectional view taken along line A-A of FIG. 2 of an exemplary embodiment of the present invention. Referring to FIGS. 2 and 3, the lamp 10 may include a first lamp module 100, a second lamp module 210, that may be disposed at a first side of the first lamp module 100 and may be configured to emit light, and a third lamp module 220, which may be disposed at the opposite (e.g., alternate or second) side of the first lamp module 100 and may be configured to emit light. The lamp 10 may also include a turn signal lamp module 300. For convenience, in some embodiments one side of the first lamp module 100, as used herein, may denote an upper portion of the first lamp module 100, and in additional exemplary embodiments the other side of the first lamp module 100 may denote a lower portion of the first lamp module 100.

The first lamp module 100, the second lamp module 210, and the third lamp module 220 may be disposed within a lamp housing 500. Light emitted from the first lamp module 100, the second lamp module 210, and the third lamp module 220 may be projected toward the exterior of the lamp housing 500 through an exterior lens 400, which may be disposed toward the front (e.g., proximate portion) of the lamp housing 500. The first lamp module 100 may disposed between the second lamp module 210 and the third lamp module 220 and may be configured to emit light to form a predetermined image.

As illustrated in FIG. 3, the first lamp module 100 may include a first light source 110 and an interior lens 120. The first light source 110 may be disposed toward the rear portion of the interior lens 120 and may irritate light toward the interior lens 120. Additionally, the first light source 110 may generate light. A light-emitting diode (LED) may be used as the first light source 110. In other words, a bulb-type lamp may be used as the first light source 110. For example, the bulb-type lamp may include a halogen lamp, a high-intensity discharge (HID) lamp, or the like. The first light source 110 may include a plurality of light sources configured emit a required amount of light, and the arrangement of the plurality of light sources may vary.

The interior lens 120 may be disposed at the front (e.g., the proximate portion) of the first light source 110 and may project light emitted from the first light source 110. The interior lens 120 may include any type of lens that can be used as the interior lens 120. The interior lens 120 may include a front portion (e.g., a proximal portion) 121, which may be positioned adjacent to the first light source 110. The interior lens may further include, a first sidewall portion 122, that may extend rearward (e.g., toward the distal portion) from an upper side of the front portion 121 and a second sidewall portion 125, that may extend rearward (e.g., toward the distal portion) from a lower side of the first front portion 121. Furthermore, a first flange portion 123, may extend upward (e.g., in a longitudinal direction) from a rear side of the first sidewall portion 122, and a second flange portion 126, may extend downward (e.g., in a longitudinal direction) from the rear of the second sidewall portion 125. Additionally, a first protrusion portion 124, may extend forward (e.g., toward a proximal position) from an upper side of the first flange portion 123, and a second protrusion portion 127, may extend forward (e.g., toward a proximal position) from a lower side of the second flange portion 126.

A portion of the light emitted from the first light source 110 may be projected forward (e.g., toward the proximal position) through the front portion 121, the first sidewall portion 122, and the second sidewall portion 125. The first sidewall portion 122 may be upwardly inclined, and the second sidewall portion 125 may be downwardly inclined. A first light guide 212 of the second lamp module 210 may be disposed at the front of the first flange portion 123, and a second light guide 222 of the third lamp module 220 may be disposed at the front of the second flange portion 126. The first protrusion portion 124 may restrict an upward movement of the first light guide 212, and may be disposed within the first flange portion 123. The second protrusion portion 127 may restrict a downward movement of the second light guide 222, and may be disposed within the second flange portion 126.

As illustrated in FIG. 3, the first flange portion 123 and the first protrusion portion 124 may be formed to surround a portion of the first light guide 212, and the second flange portion 126 and the second protrusion portion 127 may be formed to surround a portion of the second light guide 222. The second lamp module 210 may be positioned at the upper portion of the first lamp module 100 and may be configured to emit light. The second lamp module 210 may include a second light source (not illustrated), the first light guide 212, a first half mirror 214, and a first reflector 213.

The second light source may be configured to generate light. For example, an LED may be used as the second light source, but the invention is not limited thereto. Although not illustrated in FIG. 3, the second light source may disposed proximate to the end portion of the first light guide 212. The second light source may be configured to emit light toward the end portion of the first light guide 212. The second light source may be disposed at the end portion of the first light guide 212. In particular, the location of the second light source or the plurality of second light sources provided in the second lamp module 210 may vary according to the layout of the second lamp module 210 or the required amount of light.

Further, the first light guide 212 may be configured to emit light emitted from the second light source toward the first half mirror 214. In other words, the first light guide 212 may transmit light emitted from the second light source to toward the first half mirror 214. The first light guide 212 may have a sustainably straight-line shape and/or a substantially curved shape depending on the shape of the exterior of the interior lens 120. Additionally, more than one first light guide 212 may be used. A portion of the first light guide 212 may be surrounded by the first flange portion 123 and the first protrusion portion 124.

Figure 4:
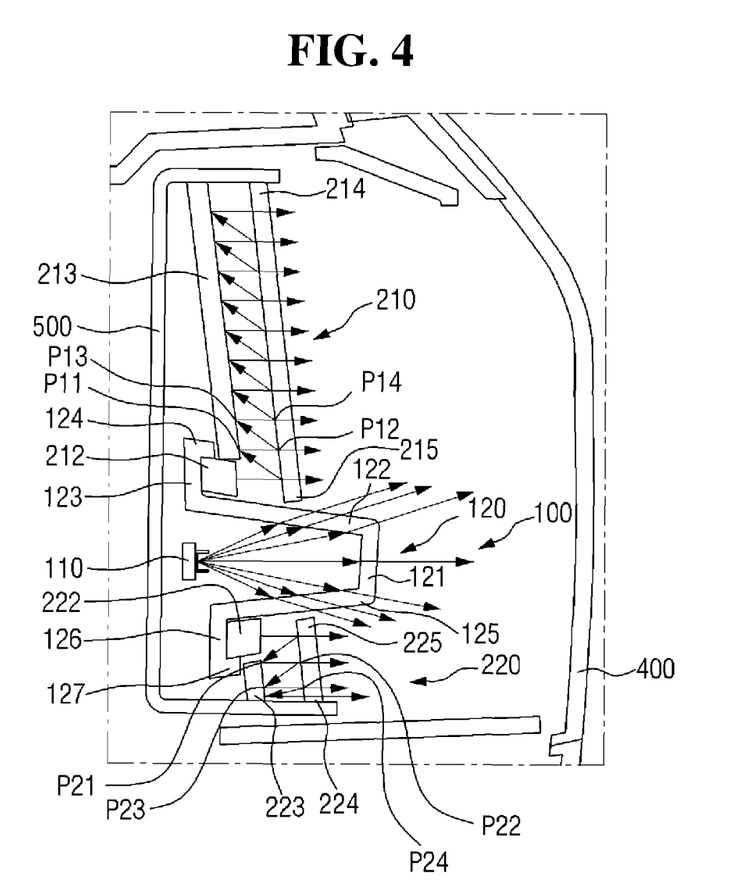
FIG. 4 is an exemplary cross-sectional view illustrating optical paths of first, second and third lamp modules of FIG. 3 according to an exemplary embodiment of the present invention.

The first half mirror 214 may transmit a portion of the light emitted from the second light source therethrough and may reflect the remaining portion of the emitted light. As illustrated in FIG. 4, the first half mirror 214 may transmit a portion of the light incident thereupon from the second light source through the first light guide 212 toward (e.g., in the direction of) a forward portion thereof and the remaining portion of the incident light may be reflected toward (e.g., in the direction of) the first reflector 213. In other words, the first half mirror 214 may transmit a portion of the light therethrough and may reflect the remaining portion of light toward a rear upper portion thereof. Accordingly, the amount of light transmitted through the first half mirror 214 may decrease toward the upper side of the first half mirror 214, which will be described below in detail further detail with reference to FIG. 4.

Further, the first half mirror 214 may include a first extension portion 215 that may extend beyond the first reflector 213 toward the interior lens 120. As illustrated in FIG. 3, the first extension portion 215 may be disposed below (e.g., beneath, a reduced longitudinal position) a lower end of the first reflector 213. The first extension portion 215 may be position adjacent to the first light guide 212. Additionally, the first reflector 213 may be positioned at an upper side of the path of the light emitted from the first light guide 212. In other words, of the majority of the light emitted from the first light guide 212 may be emitted toward the first extension portion 215. In particular, the majority of the light transmitted by the first light guide 212 after being emitted from the second light source may be incident upon the first extension portion 215. The first reflector 213 may be positioned adjacent to the first half mirror 214. The first reflector 213 may reflect light reflected from the first half mirror 214 that may be disposed at the front of the first reflector 213, toward the first half mirror 214.

As illustrated in FIG. 3, the first reflector 213 may disposed at the rear portion of, and isolated from, the first half mirror 214. The first reflector 213 may be positioned parallel to the first half mirror 214. In particular, the distance between the first reflector 213 and the first half mirror 214 may be uniform. The first reflector 213 and the first half mirror 214 may be formed to be parallel to each other in order to prevent distortion of a repetition image formed by the first reflector 213 and the first half mirror 214 and to allow the repetition image to be uniform. See FIG. 5. The first reflector 213 may include a metal coating layer, which may be formed on a front surface of the first reflector 213 positioned adjacent to the first half mirror 214 and may contain a metal with high reflective properties such as chromium (Cr) or aluminum (Al).

As illustrated in FIG. 3, the first half mirror 214 and the first reflector 213 may be downwardly inclined. Additionally, the lower sides of the first half mirror 214 and the first reflector 213 are respectively positioned ahead (e.g., proximate to, in front of) of the upper sides of the first half mirror 214 and the first reflector 213. The upper sides of the first reflector 213 and the first half mirror 214 may be coupled together by hooks, screws, adhesives or the like.

Furthermore, the third lamp module 220 may be positioned at the lower side of the first lamp module 100 and may be configured to emit light. The third lamp module 220 may have an alternate emission area from the second lamp module 210. See FIG. 2. The third lamp module 220 may include a third light source (not illustrated), the second light guide 222, a second half mirror 224, and a second reflector 223. The third light source may be configured to generate light. An LED may be used as the third light source. Although not illustrated in FIG. 3, the third light source may be disposed proximate to the end portion of the second light guide 222. The third light source may be configured to emit light toward the end portion of the second light guide 222. The third light source may be disposed at the end portion of the second light guide 222. For example, the location of the third light source or the plurality of third light sources that may be provided in the third lamp module 220 may vary according to the layout of the third lamp module 220 or the required amount of light.

The second light guide 222 may emit light emitted from the third light source toward the second half mirror 224. For example, the second light guide 222 may transmit light emitted from the third light source toward the second half mirror 224. The second light guide 222 may have a substantially straight-line shape and/or a substantially curved shape depending on the shape of the exterior of the interior lens 120, and more than one first light guide 222 may be used. A portion of the second light guide 222 may be surrounded by the second flange portion 126 and the second protrusion portion 127. The second flange portion 126 may be positioned ahead of (e.g., in front of) the first flange portion 123, and may be positioned ahead of the second light guide 222.

The second half mirror 224 may transmit a portion of the light emitted from the third light source therethrough and may reflect the remaining portion of the light. As illustrated in FIG. 4, the second half mirror 224 may transmit a portion of light incident thereupon from the third light source through the second light guide 222 therethrough and may reflect the remaining portion of the incident light toward the second reflector 223. For example, the second half mirror 224 may transmit a portion of light therethrough toward a forward side thereof and may reflect another portion of the light toward a rear lower portion thereof. Additionally, the portion (e.g., amount, quantity) of light transmitted through the second half mirror 224 may decrease toward the lower side of the second half mirror 224, and will be described below in detail with reference to FIG. 4. The second half mirror 224 may include a second extension portion 225, which may extend farther than the second reflector 223 toward the interior lens 120.

As illustrated in FIG. 3, the second extension portion 225 may be disposed above an upper end portion of the second reflector 223. The second extension portion 225 may be positioned adjacent to the second light guide 222. Additionally, the second reflector 223 may be positioned at a lower side of the path of light emitted from the second light guide 222. For example, the majority of the light emitted from the second light guide 222 may be emitted toward the second extension portion 225. In other words, the majority of the light that may be transmitted by the second light guide 222 after being emitted from the third light source may be incident upon the second extension portion 225. The second reflector 223 may be positioned adjacent to the second half mirror 224. The second reflector 223 may reflect light reflected from the second half mirror 224, which may be disposed at the front of the second reflector 223, toward the second half mirror 224.

As illustrated in FIG. 3, the second reflector 223 may disposed at the rear portion of, and isolated from, the second half mirror 224. The second reflector 223 may be positioned parallel to the second half mirror 224. Accordingly, the distance between the second reflector 223 and the second half mirror 224 may be uniform. The second reflector 223 and the second half mirror 224 may be formed to be parallel to each other to prevent distortion of a repetition image formed by the second reflector 223 and the second half mirror 224 and to allow the repetition image to be uniform. See FIG. 5. The second reflector 223, like the first reflector 213, may include a metal coating layer, that may be formed on a front surface of the first reflector 213 adjacent to the first half mirror 214 and may contain a metal with high reflective properties such as Cr or Al.

As illustrated in FIG. 3, the second half mirror 224 and the second reflector 223 may be forwardly inclined. In particular, the lower sides of the second half mirror 224 and the second reflector 223 may be respectively positioned ahead of (e.g., proximate to) the upper sides of the second half mirror 224 and the second reflector 223. The lower sides of the second reflector 223 and the second half mirror 224 may be coupled together by a plurality of hooks, screws, adhesives or the like. Each of the first half mirror 214 and the second half mirror 224 may include a metal coating layer, for example, a coating layer may be formed with Cr, Al or a metal oxide. The metal coating layer may be formed by spin coating, spray coating, sputtering deposition, vacuum deposition, plasma deposition or the like. For example, the first half mirror 214 and the second half mirror 224 may be formed as films. The second half mirror 224 may be formed to have a reduced or an area less than the area of the first half mirror 214. Additionally, the third lamp module 220 may have an emission area than may be less than the emission area of the second lamp module 210. The turn signal lamp module 300 may be disposed below (e.g., beneath) the third lamp module 220. The turn signal lamp module 300 may be controlled (e.g., turned on or off) by the driver's manipulation to thereby alter the other vehicle of the vehicles intention to execute a left turn or a right turn.

Figure 5:
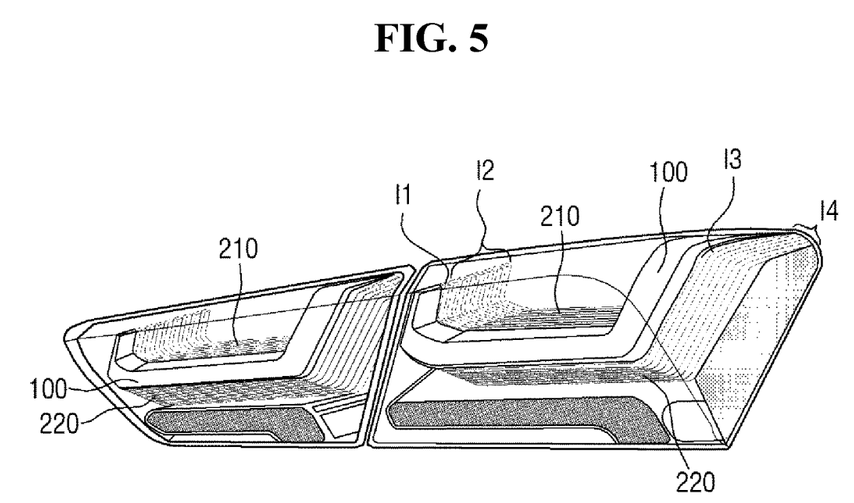
FIG. 5 is an exemplary view illustrating a repetition image that can be formed by the lamp for a vehicle according to an exemplary embodiment of the invention.

FIG. 4 is an exemplary cross-sectional view illustrating optical paths of the first, second and third lamp modules of FIG. 3. FIG. 5 is an exemplary view illustrating a repetition image that may be formed by the lamp for a vehicle according to an exemplary embodiment of the invention. Referring to FIGS. 4 and 5, the first half mirror 214 and the first reflector 213 may form an original image I1 or I3 and one or more repetition images I2 and I4, that may be reflections of the original image I1 or I3, with the use of light emitted from the second light source.

As illustrated in FIGS. 4 and 5, the light emitted from the second light source may be emitted toward the first half mirror 214 via the first light guide 212. The light incident upon the first extension portion 215 of the first half mirror 214 from the first light guide 212 may be repeatedly transmitted through and reflected from between the first half mirror 214 and the first reflector 213, thereby forming the repetition images I2. For example, in response to light that may be emitted from the first light guide 212 being incident upon the first extension portion 215 of the first half mirror 214, a portion of the incident light may be transmitted through the first extension portion 215, and the remaining portion of the incident light may be reflected toward the first reflector 213.

As illustrated in FIG. 4, the light reflected from the first extension portion 215 of the first half mirror 214 may be incident upon a first point P11 of the first reflector 213 and may be reflected to a second point P12 of the first half mirror 214. A portion of the light incident upon the second point P12 of the first half mirror 214 may be transmitted through the first half mirror 214, and the remaining portion of the incident light may be reflected to a third point P13 of the first reflector 213. Further, the light reflected to the third point P13 of the first reflector 213 may be reflected to a fourth point P14 of the first half mirror 214. A portion of light incident upon the fourth point P14 of the first half mirror 214 may be transmitted through the first half mirror 214, and the remaining portion of the incident light may be reflected to a fifth point (not illustrated) of the first reflector 213.

As illustrated in the exemplary embodiment of FIG. 4, the third point P13 may be positioned above the first point P11, and the fourth point P14 may be positioned above the second point P12. Light incident upon the first extension portion 215 of the first half mirror 214 may travel upward (e.g., longitudinally) while the light may be repeatedly reflected by the first half mirror 214 and the first reflector 213. In particular, the first half mirror 214 and the first reflector 213 may form a plurality of repetition images I2 along an upward (e.g., longitudinal) direction.

As illustrated in the exemplary embodiment of FIG. 5, the light transmitted through the first extension portion 215 of the first half mirror 214 may form the original image I1. Light traveling upward (e.g., in a longitudinal direction) between the first half mirror 214 and the first reflector 213 may form the repetition images I2 since the light may be repeatedly transmitted through and reflected from between the first half mirror 214 and the first reflector 213. In other words, the second lamp module 210 may simultaneously form the original image I1 and the repetition images I2, which may include a predetermined ratio similar to the ratio of the original image I, at the upper portion of the first lamp module 100 with light emitted from the second light source, and may improve the visual aesthetics of a vehicle. Additionally, since the amount of light transmitted through the fourth point P14 of the first half mirror 214 may be less than the amount of light transmitted through the second point P12 of the first half mirror 214, the brightness (e.g., image quality) of the repetition images I2 may decrease toward the upper side of the first half mirror 214.

Moreover, the second half mirror 224 and the second reflector 223 may form the original I3 and the repetition images I4, which are reflections of the original image I3, and may use the light emitted from the third light source. As illustrated in FIGS. 4 and 5, light emitted from the third light source may be emitted toward the second half mirror 224 via the second light guide 222. Light incident upon the second extension portion 225 of the second half mirror 224 transmitted from the second light guide 222 may be repeatedly transmitted through and reflected from between the second half mirror 224 and the second reflector 223, and may form the repetition images I4. For example, the light emitted from the second light guide 222 may be incident upon the second extension portion 225 of the second half mirror 224, and a portion of the incident light may be transmitted through the second extension portion 225, and remaining portion of the incident light may be reflected toward the second reflector 223.

As illustrated in the exemplary embodiment as shown in FIG. 4, light may be reflected from the second extension portion 225 of the second half mirror 224 and may be incident upon a first point P21 of the second reflector 213. Further, the light may be reflected to a second point P22 of the second half mirror 224. A portion of the light incident upon the second point P22 of the second half mirror 224 may be transmitted through the second half mirror 224, and the remaining portion of the incident light may be reflected to a third point P23 of the second reflector 223. The light reflected to the third point P23 of the second reflector 223 may be reflected to a fourth point P24 of the second half mirror 224. A portion of the light incident upon the fourth point P24 of the second half mirror 224 may be transmitted through the second half mirror 224, and the remaining portion of the incident light may be reflected to a fifth point (not illustrated) of the second reflector 223.

As illustrated in the exemplary embodiment as shown in FIG. 4, the third point P23 may be positioned below (e.g., beneath) the first point P21, and the fourth point P24 may be positioned below (e.g. beneath) the second point P22. Light incident upon the second extension portion 225 of the second half mirror 224 may travel downward (e.g., in a decreasing longitudinal direction) while the light may be repeatedly reflected by the second half mirror 224 and the second reflector 223. In other words, the second half mirror 224 and the second reflector 223 may form a plurality of repetition images I4 along a decreasing longitudinal direction.

As illustrated in an exemplary embodiment as shown in FIG. 5, the light transmitted through the second extension portion 225 of the second half mirror 224 may form the original image I3. Light traveling downward (e.g., in a decreasing longitudinal direction) between the second half mirror 224 and the second reflector 223 may form the repetition images I4 by being repeatedly transmitted through and reflected from between the second half mirror 224 and the second reflector 223. In particular, the third lamp module 220 may simultaneously form the original image I3 and the repetition images I4, that may include a predetermined ratio that may be similar to the original image I1, disposed at the lower portion of the first lamp module 100 having light emitted from the second light source, and may improve the visual aesthetics of a vehicle. Additionally, since the quantity of light transmitted through the fourth point P24 of the second half mirror 224 may be less than the amount of light transmitted through the second point P22 of the second half mirror 224, the brightness (e.g., image quality) of the repetition images I4 may decrease toward the downward side of the second half mirror 224.

Furthermore, as illustrated in the exemplary embodiment as shown in FIG. 4, the second light guide 222 may be positioned ahead of (e.g., proximate to) the first light guide 212, and the second half mirror 224 may be positioned ahead of (e.g., proximate to) the first half mirror 214. Additionally, as illustrated in FIG. 5, the images formed by the third lamp module 220 may visually appear to protruding farther than images formed by the second lamp module 210.

Figure 6:
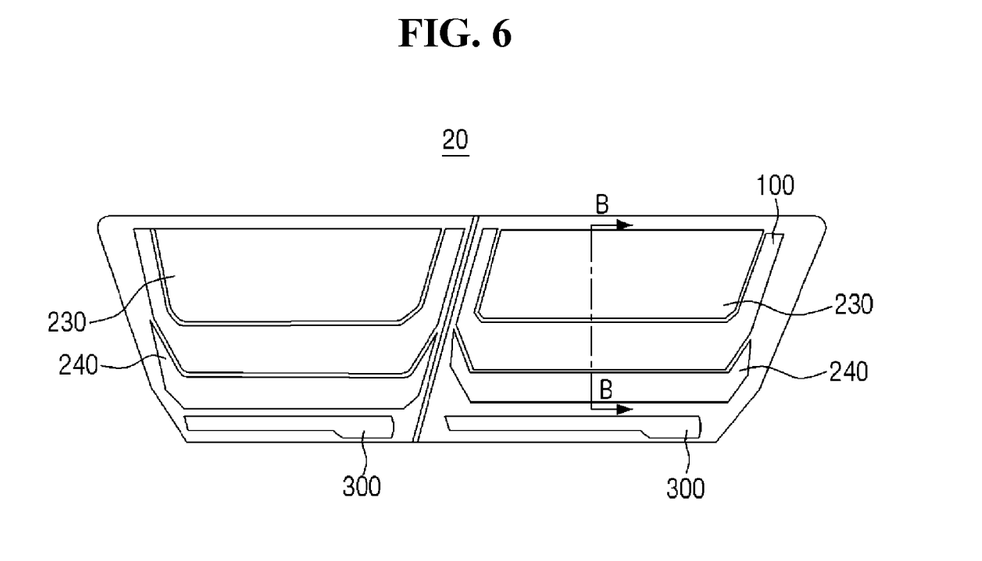
FIG. 6 is an exemplary front view illustrating a lamp for a vehicle according to another exemplary embodiment of the invention.
Figure 7:
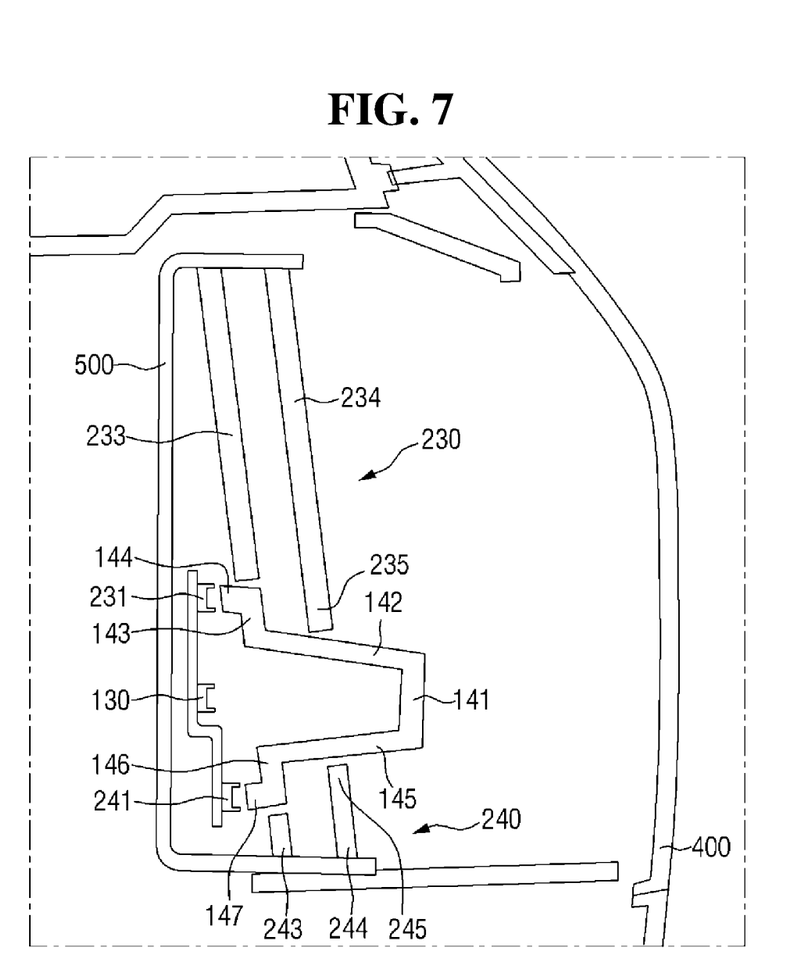
FIG. 7 is an exemplary cross-sectional view taken along line B-B of FIG. 6 according to an exemplary embodiment of the present invention.

FIG. 6 is an exemplary front view illustrating a lamp for a vehicle according to another exemplary embodiment of the invention. FIG. 7 is an exemplary cross-sectional view taken along line B-B of FIG. 6. Referring to FIGS. 6 and 7, a lamp 20 for a vehicle may include a first lamp module 100, a second lamp module 230, which may be disposed at an upper portion of the first lamp module 100 and may be configured to emit light, and a third lamp module 240, which may be disposed at a lower portion of the first lamp module 100 and may be configured to emit light. The lamp 10 may also include a turn signal lamp module. Descriptions of elements of the lamp 20 that are substantially identical to their respective counterparts of the lamp 10 of FIGS. 1 to 5 will be omitted. The first lamp module 100 may include a first light source 130 and an interior lens 140.

As illustrated in FIG. 7, the interior lens 140 includes a front portion 141, which may be disposed at the front of the first light source 130 adjacent to the first light source 130, a first sidewall portion 142, which may extend rearward (e.g., in a distal direction) from an upper side of the front portion 141, a second sidewall portion 145, which may extend rearward (e.g., in a distal direction) from a lower side of the first front portion 141, and a first flange portion 143, which may extend upward (e.g., in an increasing longitudinal direction) from a rear side of the first sidewall portion 142. A second flange portion 146, which may extend downward (e.g., in a decreasing longitudinal direction) from the rear of the second sidewall portion 145, a first guide portion 144, which may extend rearward (e.g. in a distal direction) from an upper side of the first flange portion 143, and a second guide portion 147, which may extend rearward (e.g., in a distal direction) from a lower side of the second flange portion 146.

The second lamp module 230 may include a second light source 231, a first half mirror 234, and a first reflector 233. The second light source 231 may be disposed at the rear portion of the interior lens 140 and light emitted therefrom may be incident upon the first half mirror 234 through the interior lens 140. As illustrated in an exemplary embodiment as shown in FIG. 7, the second light source 231 may be disposed proximate to a rear side of the first guide portion 144. The second light source 231 may be configured to emit light toward the first guide portion 144.

Moreover, the light emitted from the second light source 231 may be transmitted through the first guide portion 144 and may travel toward a first extension portion 235 of the first half mirror 234. In particular, the first guide portion 144 may perform the functions of a light guide for guiding light emitted from the second light source 231 to travel toward the first half mirror 234. Due to the presence of the first guide portion 144, the light emitted from the second light source 231 may be incident upon the first half mirror 234 through the interior lens 140.

The third lamp module 240 may include a third light source 241, a second half mirror 244, and a second reflector 243. The third light source 241 may be disposed at the rear portion of the interior lens 140 and light may be emitted therefrom to be incident upon the second half mirror 244 through the interior lens 140. The third light source 241 may be disposed proximate to a rear side of the second guide portion 147. The third light source 241 may be configured to emit light in the direction of the second guide portion 147. Light emitted from the third light source 241 may be transmitted through the second guide portion 147 to travel toward a second extension portion 245 of the second half mirror 244. Additionally, the second guide portion 147 may perform the function of a light guide for guiding light that may be emitted from the third light source 241 to travel toward the second half mirror 244. Due to the presence of the second guide portion 147, the light that may be emitted from the third light source 241 may be incident upon the second half mirror 244 through the interior lens 140.

As illustrated in FIG. 7, the first light source 130 may be disposed between the second light source 231 and the third light source 241. The first light source 130, the second light source 231, and the third light source 241 may be installed on a printed circuit board (PCB) (not illustrated). As further illustrated in FIG. 7, the third light source 241 may be positioned ahead of (e.g., proximate to) the second light source 231.

Figure 8:
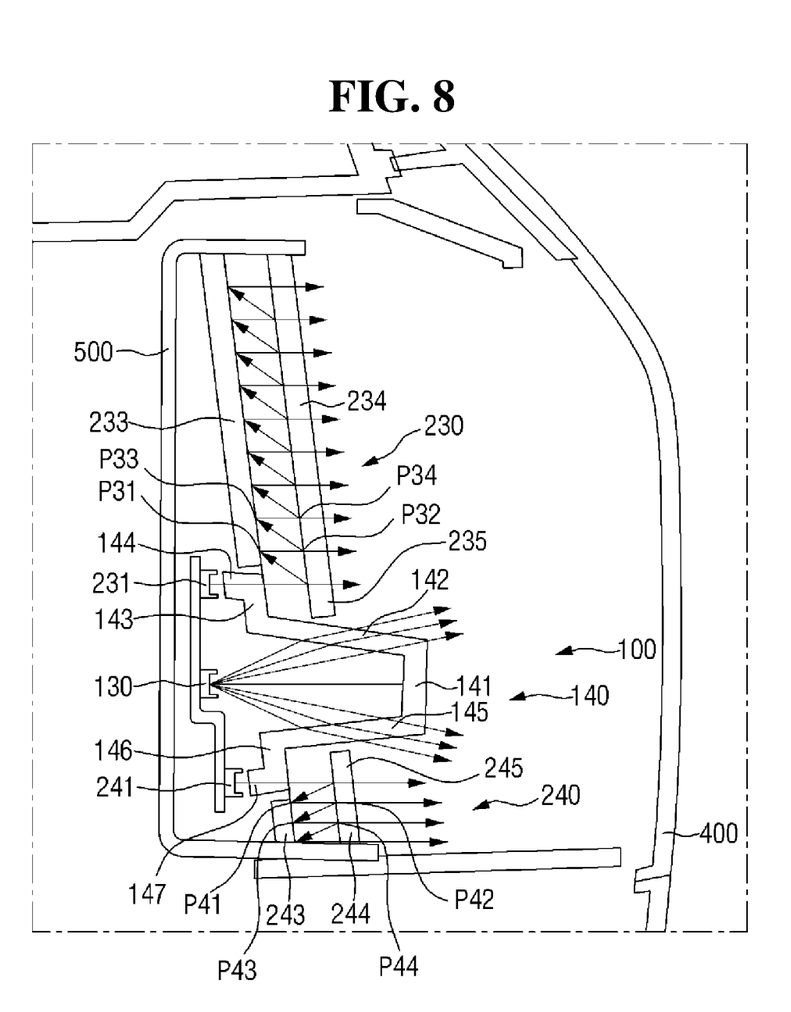
FIG. 8 is an exemplary cross-sectional view illustrating optical paths of first, second and third lamp modules of FIG. 7 according to an exemplary embodiment of the present invention.

FIG. 8 is an exemplary cross-sectional view illustrating the optical paths of the first, second and third lamp modules of FIG. 7. Referring to FIG. 8, the first reflector 233 may be disposed at an upper side of the path of light that may be emitted from the second light source 231. The second reflector 243 may be disposed at a lower side of the path of light emitted from the third light source 241. The light emitted from the first light source 130 may be transmitted through the front portion 141, the first sidewall portion 142 and the second sidewall portion 145 of the interior lens 140. Light transmitted through the interior lens 140 after being emitted from the first light source 130 may be emitted toward the exterior of the lamp 20 through the exterior lens 400.

Light emitted from the second light source 231 may be transmitted through the first guide portion 144 of the interior lens 140 and may then be incident upon the first extension portion 235 of the first half mirror 234. A portion of the light incident upon the first extension portion 235 may be transmitted through the first half mirror 234, and the remaining portion of the incident light may be reflected to a first point P31 of the first reflector 233. The light reflected to the first point P31 of the first reflector 233 may be repeatedly reflected and may be incident upon a second point P32 of the first half mirror 234. Some of the light incident upon the second point P32 of the first half mirror 234 may be transmitted through the first half mirror 234, and the remaining portion of the incident light may be reflected to a third point P33 of the first reflector 233. The light reflected to the third point P33 of the first reflector 233 may be repeatedly reflected and may be incident upon a fourth point P34 of the first half mirror 234. A portion of the light incident upon the fourth point P34 of the first half mirror 234 may transmitted through the first half mirror 234, and the remaining portion of the incident light may be reflected to a fifth point (not illustrated) of the first reflector 233.

Light transmitted through the first half mirror 234 may be emitted toward the exterior of the lamp 20 through the exterior lens 400. Images formed by the second lamp module 230 are as described above with reference to FIG. 5, and thus, detailed descriptions thereof will be omitted. Light emitted from the third light source 241 may be transmitted through the second guide portion 147 of the interior lens 140 and may then be incident upon the second extension portion 245 of the second half mirror 244.

A portion of the light incident upon the second extension portion 245 may be transmitted through the second half mirror 244, and the remaining portion of the incident light may be reflected to a first point P41 of the second reflector 243. The light reflected to the first point P41 of the second reflector 243 may be reflected again and may be incident upon a second point P42 of the second half mirror 244. A portion of the light incident upon the second point P42 of the second half mirror 244 may be transmitted through the second half mirror 244, and the remaining portion of the incident light may be reflected to a third point P43 of the second reflector 243. The light reflected to the third point P43 of the second reflector 243 may be reflected again and may be incident upon a fourth point P44 of the second half mirror 244.

A portion of the light incident upon the fourth point P44 of the second half mirror 244 may be transmitted through the second half mirror 244, and the remaining portion of the incident light may be reflected to a fifth point (not illustrated) of the second reflector 243. Light transmitted through the second half mirror 244 may be emitted toward the exterior of the lamp 20 through the exterior lens 400. Images formed by the third lamp module 240 are as described above with reference to FIG. 5, and thus, detailed descriptions thereof will be omitted.

While the exemplary embodiments of the present invention have been particularly shown and described the present invention is not restricted by the specific embodiment. It is to be appreciated that those of ordinary skill in the art can modify the exemplary embodiment in various ways without departing from the spirit and scope of the invention and the modified exemplary embodiments should not be construed individually from the technical spirit or prospect of the present invention.

What is claimed is:
1. A lamp for a vehicle, comprising:
a first lamp module including an interior lens and at least one first light source, configured to emit light toward the interior lens;
a second lamp module disposed on a first side of the first lamp module and configured to emit light; and a third lamp module disposed on a second side of the first lamp module, configured to emit light, and having a different emission area from the second lamp module, wherein the second lamp module having at least one second light source, configured to emit light, a first half mirror, configured to transmits a portion of the light emitted from the second light source therethrough and configured to reflect a residual portion of the emitted light, and a first reflector, positioned adjacent to the first half mirror and configured to reflect the light reflected from the first half mirror back to the first half mirror, and the third lamp module having at least one third light source, configured to emit light, a second half mirror, configured to transmit a portion of the light emitted from the third light source therethrough and configured to reflect a remaining portion of the emitted light, and a second reflector, positioned adjacent to the second half mirror and configured to reflect the light reflected from the second half mirror back to the second half mirror, and wherein the first reflector is disposed parallel to the first half mirror and the second reflector is disposed parallel to the second half mirror.

2. The lamp of claim 1, wherein the first half mirror includes a first extension portion, which extends farther than the first reflector toward the interior lens, and the second half mirror includes a second extension portion, which extends farther than the second reflector toward the interior lens.

3. The lamp of claim 2, wherein the light emitted from the second light source is incident upon the first extension portion and the light emitted from the third light source is incident upon the second extension portion.

4. The lamp of claim 1, wherein the third light source is positioned proximate to the second light source.

5. The lamp of claim 1, wherein the second light source is disposed at a rear portion of the interior lens so as for the light emitted therefrom to be incident upon the first half mirror through the interior lens and the third light source is disposed at a rear portion of the interior lens so as for the light emitted therefrom to be incident upon the second half mirror through the interior lens.

6. The lamp of claim 1, further comprising:
a first light guide configured to emit the light from the second light source toward the first half mirror; and
a second light guide configured to emit the light from the third light source toward the second half mirror.

7. The lamp of claim 6, wherein the second light guide is positioned proximate to the first light guide.

8. The lamp of claim 1, wherein the first half mirror and the first reflector form a first original image and one or more first repetition images that are reflections of the first original image with the light emitted from the second light source, and the second half mirror and the second reflector form a second original image and one or more second repetition images, which are reflections of the second original image, with the light emitted from the third light source.

9. The lamp of claim 8, wherein the first half mirror and the first reflector form the first repetition images along a first direction and the second half mirror and the second reflector form the second repetition images along a second direction.

10. A lamp for a vehicle, comprising:
a first lamp module including an interior lens and at least one first light source, configured to emit light toward the interior lens;
a second lamp module disposed on a first side of the first lamp module and configured to emit light; and
a third lamp module disposed on a second side of the first lamp module, configured to emit light, and having a different emission area from the second lamp module,
wherein the second lamp module having at least one second light source, configured to emit light, a first half mirror, configured to transmits a portion of the light emitted from the second light source therethrough and configured to reflect a residual portion of the emitted light, and a first reflector, positioned adjacent to the first half mirror and configured to reflect the light reflected from the first half mirror back to the first half mirror, and the third lamp module having at least one third light source, configured to emit light, a second half mirror, configured to transmit a portion of the light emitted from the third light source therethrough and configured to reflect a remaining portion of the emitted light, and a second reflector, positioned adjacent to the second half mirror and configured to reflect the light reflected from the second half mirror back to the second half mirror, and
wherein the second light source is disposed at a rear portion of the interior lens so as for the light emitted therefrom to be incident upon the first half mirror through the interior lens and the third light source is disposed at a rear portion of the interior lens so as for the light emitted therefrom to be incident upon the second half mirror through the interior lens.

11. The lamp of claim 10, wherein the first half mirror includes a first extension portion, which extends farther than the first reflector toward the interior lens, and the second half mirror includes a second extension portion, which extends farther than the second reflector toward the interior lens.

12. The lamp of claim 11, wherein the light emitted from the second light source is incident upon the first extension portion and the light emitted from the third light source is incident upon the second extension portion.

13. The lamp of claim 10, wherein the third light source is positioned proximate to the second light source.

14. The lamp of claim 10, wherein the first reflector is disposed in parallel to the first half mirror and the second reflector is disposed in parallel to the second half mirror.

15. The lamp of claim 10, wherein the first half mirror and the first reflector form a first original image and one or more first repetition images that are reflections of the first original image with the light emitted from the second light source, and the second half mirror and the second reflector form a second original image and one or more second repetition images, which are reflections of the second original image, with the light emitted from the third light source.

16. The lamp of claim 15, wherein the first half mirror and the first reflector form the first repetition images along a first direction and the second half mirror and the second reflector form the second repetition images along a second direction.

* * * * *